Patented May 23, 1933

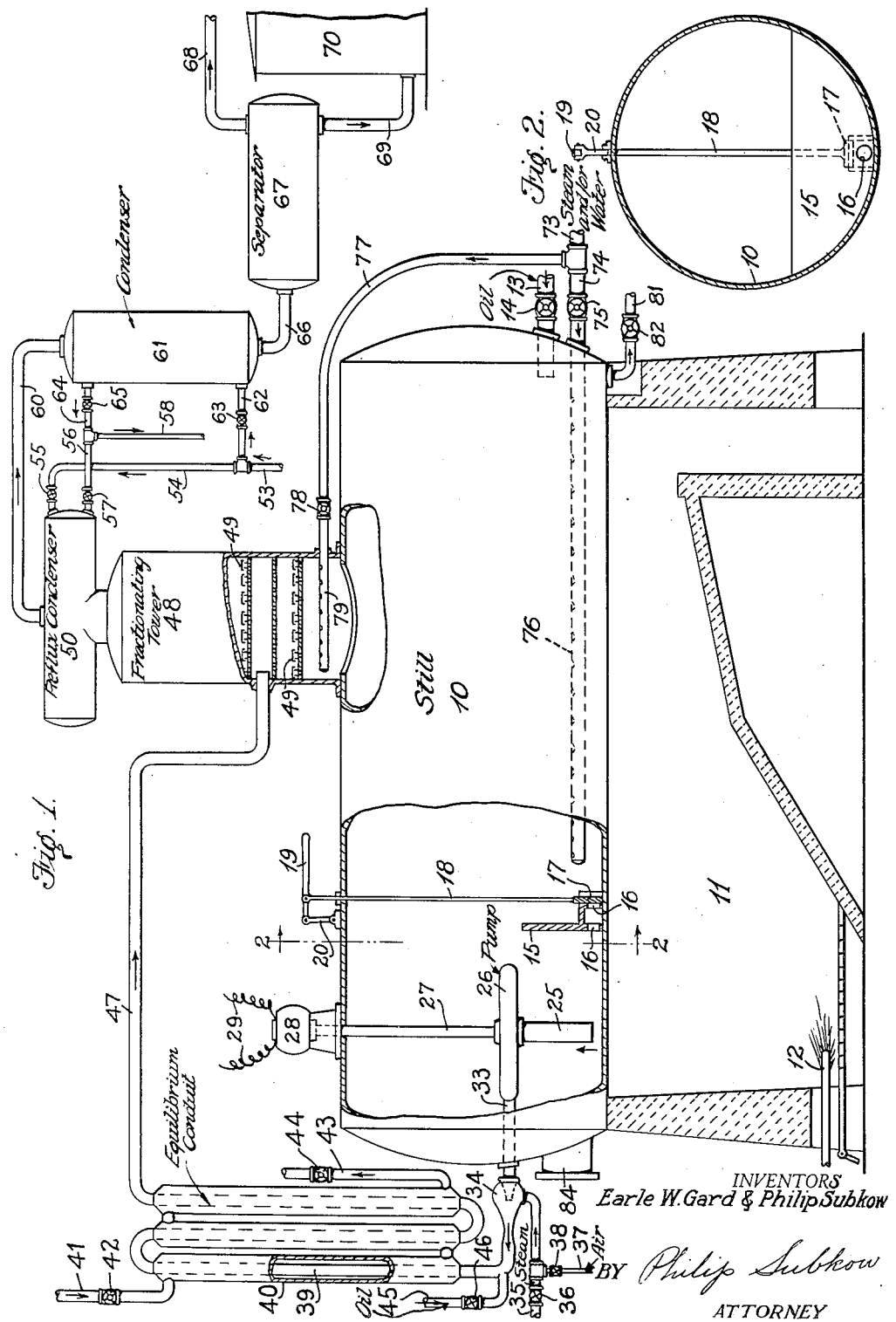

1,911,114

UNITED STATES PATENT OFFICE

EARLE W. GARD, OF PALOS VERDES ESTATES, AND PHILIP SUBKOW, OF LOS ANGELES, CALIFORNIA, ASSIGNORS TO UNION OIL COMPANY OF CALIFORNIA, OF LOS ANGELES, CALIFORNIA, A CORPORATION OF CALIFORNIA

PROCESS AND APPARATUS FOR PRODUCING ASPHALT

Application filed October 11, 1930. Serial No. 488,144.

This invention relates to a process and apparatus for treating petroleum oils and in particular to the production of oxidized or air blown asphalt.

It is an object of our invention to provide a simple, efficient and economical process and apparatus by which petroleum oils may be converted into asphaltic products of desired penetration, melting point, ductility and solubility.

It is another object of our invention to control the various characteristics of penetration, melting point, ductility and solubility of asphalt and to vary them independently and at will.

It is a further object of our invetnion to control oxidation of oil to produce asphalt so as to obtain a uniformly oxidized asphalt.

It is another object of our invention to provide a process and apparatus for controlling the intermingling of the oil and oxygen containing gas, to regulate the rate of reaction, to control the character of the oxidation and to control the temperature of oxidation.

It is a further object of this invention to control the oxidation of the oil so as to partially oxidize the oil by contacting it with oxygen containing gas, to produce substantially complete use of the oxygen under controlled conditions, to remove the gaseous and vaporous reaction products and to repeat this partial oxidation in a recurring cycle of operation until products of desired characteristics are obtained.

It is a more important object of our invention to control the character of the products removed during oxidation and to return certain desirable constituents to the oil undergoing oxidation, thereby obtaining a higher recovery of oxidized asphalt.

Another important object of our invention is to control independently the melting point, penetration and ductility of the asphalt by the addition of extraneous oil or oil fractions to the asphalt.

Other objects of the invention will appear from the included description of the preferred embodiment of our process and apparatus.

In the conventional method of producing oxidized asphalt, air and steam in varying proportions are introduced into the bottom of a cylindrical still containing asphaltic oil and at the same time the asphaltic oil is heated to a temperature sufficient to obtain the necessary oxidizing reaction, i. e. about 450 to 550° F. The oxidation is usually continued from 18 to 36 hours, depending upon the character of the original stock and the characteristics desired in the final product. By such method, it is impossible to obtain the highest grade of asphalt. This is partly due to the fact that the air, in passing through the oil in large globules, is not likely to mix intimately with the oil, thereby resulting in the production of an asphalt which is partly over-oxidized and partly under-oxidized. Also, a uniform temperature is difficult to maintain since the oxidizing reaction is exothermic and the added heat may result in overheating the asphaltic oil to a point of cracking and formation of carbonaceous matter thereby rendering the product more brittle and less ductile and soluble than if uniform oxidation could have been effected.

We have discovered that in order to produce asphalts of high melting point which will have high ductility and solubility and low penetration characteristics, it is necessary to produce an intimate mixture of the oil to be oxidized and the oxygen containing gas, such as air, oxygen, or ozone, so that all parts of the oil are simultaneously exposed to the action of the oxygen. It is also desirable to maintain the air in intimate contact with the oil for sufficient time so that the oxygen of the air is consumed as much as possible This promotes efficiency in the use of air and also permits the more refractory components of the oil to be oxidized. These components need more time since they oxidize much slower. During this reaction an increase in the temperature occurs and provision should be made to control the temperature in order to prevent over-oxidation. This, it will be found, necessitates under most circumstances an abstraction of heat, except when very hard asphalts are desired. In the prior method, in order to obtain any amount of cooling, so much excess air has been used as to result in over-oxidation and uncontrolled oxidation and a rise in temperature due to oxidation counterbalances the cooling effect and actually heats the oil. By our present method, the amount of air used is small and the cooling is controlled by heat exchange. We have also found that the products of the reaction should be removed so that the partially oxidized components may be again contacted with fresh air.

Another important disadvantage of the conventional method of producing asphalt resides in the fact that during oxidation certain desirable constituents of the oil are separated therefrom and are passed out of the still together with excess air, fixed gases and light vapors. In most instances, these constituents are oxidizable oil fractions which yield the characteristics desirable in oxidized asphalt. One of the main features of our invention is concerned with the return of these constituents to the asphalt in the still.

We have found that in order to obtain asphalts of high melting point and high ductility for the desired penetration, it is necessary to oxidize and to retain in the asphalt certain fractions which yield the characteristics desired in oxidized asphalt. These fractions are usually distillates from 100 seconds Saybolt viscosity and upwards at 100° F. contained in the original stock and may comprise oxidizable oil fractions of lubricating oil viscosity range and also lighter fractions including gas oil, depending upon the character of the crude oil and the temperature at which it is topped. During oxidation, the combined lifting effect of the air, water produced and the light gas oil fractions produced in the oxidation, cause a distillation of material percentages of the above mentioned distillates. It is these distillates which help to give the desirable characteristics on oxidation. If these oils are entirely removed from the asphaltic oil, we would obtain practically unoxidizable asphalt and thereby produce hard asphalts of high melting point and low penetration and solubility. If they are retained in the asphalt, the melting point and ductility are increased for any given penetration. Likewise, the solubility is increased. It is, therefore, one of the objects of our invention to provide a process and apparatus whereby these oxidizable oil distillates of lubricating oil viscosity range may be continuously returned to the oxidizing still and thus produce asphalt having the desired characteristics as to melting point, penetration, ductility and solubility.

We have also discovered that the characteristics of an asphalt as to melting point, ductility and penetration, may be independently controlled by the introduction of another oil into the asphalt. This extraneous oil may be chosen in order to vary the particular characteristic of either melting point, ductility or penetration in the asphalt. Thus, oil fractions, such as steam blown asphalt from various types of crudes, lubricating oil fractions, gas oil, sulphurized oils, vegetable oils or animal oils, may be added to the asphalt depending upon the characteristics desired in the final product. The extraneous oil may also be chosen to increase the proportion of desirable constituents in the original asphaltic oil or may be chosen to replace certain desirable constituents that are removed from the original oil due to distillation or converted by decomposition during oxidation into lighter and undesirable fractions.

As may be observed from the above, the invention comprises in its broadest phases, a process for producing asphalt which comprises intimately commingling oil with an oxygen containing gas at an elevated temperature to convert said oil into asphalt, separating vapors and gases from the oil, condensing a portion of the vapors and returning the thus produced condensate to the oil undergoing oxidation. The invention further includes the addition of extraneous oils to the oil either before, during, or after oxidation.

In a more narrow statement of the invention, it comprises a process for producing asphalt which comprises maintaining a bulk supply of oil at an elevated temperature, removing a portion of said oil and intimately mixing it with an oxygen containing gas in an injector, passing the mixture through a coil and controlling the temperature of said mixture, introducing said mixture of commingled gases and vapors into a fractionating tower, separating gases and vapors from said oil in said tower, rectifying the vapors and refluxing to said tower unoxidized oil constituents of lubricating oil viscosity range and gas oil fractions, removing vapors and gases lighter than said unoxidized constituents from the oil in said fractionating tower and returning fractionated oil in said tower to said bulk supply of oil.

The invention also includes the addition of other oils to said bulk supply of oil either before, during or after oxidation in order to vary the characteristics of melting point, ductility and penetration independently. The invention also includes apparatus for accomplishing the above process.

Other features and objects of the invention will be apparent by reference to the drawing which shows an apparatus for carrying out the process described herein. Fig. 1 is an arrangement of a still and apparatus for producing oxidized asphalt, being shown with parts broken away. Fig. 2 is a cross-sectional view taken along line 2—2 of Fig. 1.

In the drawing, 10 is a cylindrical still for containing the bulk supply of oil to be treated.

11 is a fire box or furnace on which still 10 is positioned. 12 is a burner for supplying heat to the fire box 11. 13 is a line controlled by valve 14 for introducing oil into the still 10. 15 is a baffle plate extending across the bottom of the still to form two compartments in the bottom of the still. 17 is a slide valve positioned in the extreme bottom of the baffle plate 15 to allow oil to flow from one side to the other side of the baffle plate 15 through openings 16. 18 is a rod connected to slide valve 17 and valve lever 19 to open or close the slide valve. 20 is a fulcrum support so that the valve handle 19 may be properly operated. 25 is a suction line extending into the bottom of the still and leading to pump 26 which is preferably of the centrifugal type. Pump 26 is provided with shaft 27 connected to motor 28 which is driven electrically from leads 29. 33 is a discharge line from pump 26 and is connected at its other end to mixer or injector 34. 35 is a line controlled by valve 36 for introducing steam into the mixer 34. This line may also be used for introducing oil. 37 is a line controlled by valve 38 for introducing an oxygen containing gas, such as air, oxygen or ozone into the mixer. 39 is an equilibrium conduit in which oxidation of the oil takes place. 40 is a heat exchanger of which the equilibrium conduit is a part and is used for heating or cooling the oil during its passage through the equilibrium conduit. Heating or cooling media may be introduced into the jacket of the exchanger 40 via line 41 controlled by valve 42 and may exit therefrom via line 43 controlled by valve 44. Any desired material may be used for cooling or heating in the heat exchanger, such as steam, air or oil. It is obvious that instead of using a jacketed pipe for the equilibrium conduit and heat exchanger, any other type of cooling means may be employed as, for instance, an aerial cooler including means for regulating the flow of air over the coil 39. 45 is a line controlled by valve 46 permitting the introduction of an extraneous oil into the equilibrium conduit 39. 47 is a line for carrying oil, vapor and gases from equilibrium conduit 39 to a fractionating tower 48 which is provided with bubble plates 49. 50 is a reflux condenser for knocking back into the fractionating tower 48 certain fractions desired to be returned to still 10. The reflux condenser is cooled by fluid, such as water or oil, introduced into the reflux condenser through line 53, line 54 controlled by valve 55 and exiting from the reflux condenser via line 56 controlled by valve 57, and line 58. 60 is a vapor line connected to condenser 61, the latter being cooled by fluid introduced through line 53, line 62 controlled by valve 63 and exiting from the condenser via line 64 controlled by valve 65, and line 58. 66 is a line connecting condenser 61 and separator 67. 68 is an exit for gases. 69 is a line for passing condensate from separator 67 into storage tank 70. Steam and/or air for agitating purposes may be introduced into the still 10 via line 73, line 74 controlled by valve 75 and agitating spider 76 and into the fractionating tower 48 via line 73, line 77 controlled by valve 78 and perforated pipe 79. 81 is a line controlled by valve 82 for pumping out or draining the still 10. 84 is a manhole for cleaning the still.

In operation, a hydrocarbon oil, preferably a residuum obtained by distilling off the lighter oils, such as kerosene and perhaps gas oil, from crude oil is introduced into the still 10 via line 13 and valve 14. When the required charge is in the still, pump 26 driven by shaft 27 and motor 28 connected to an electrical circuit by leads 29, is started and the oil in the still 10 is pumped into line 33 and into mixer 34 and is then forced through equilibrium conduit 39 of heat exchanger 40 where it is heated by any heating medium such as steam, air or hot oil, entering through line 41 and valve 42 and exiting from the heat exchanger via line 43 and valve 44. The oil then flows via line 47 to fractionating tower 48 and then drops back into the still 10. During the heating period, slide valve 17 located in baffle plate 16 and operated by connecting link 18 connected to handle 19 which is supported by fulcrum 20 is opened. The fire under the still 10 is lighted and the oil is additionally heated by hot combustion gases in fire box 11, the temperature being controlled by burners 12. The oil is circulated and additional material is introduced into the still through line 13 or, preferably, through line 45 and valve 46. As soon as the required amount of oil, about 300 barrels, is charged into the still, valve 46 is closed and about 200 cubic feet of air per minute is admitted into the mixer 34 through line 37 and valve 38. If desired, steam may be admitted into the mixer via line 35 and valve 36. The oil is now circulating at the rate of between 1500 and 2000 barrels per hour by pump 26. This rate of air admission is continued until the oil in the still 10 reaches the temperature of around 300° F. This should require about one hour. The air is then increased to 300 cubic feet per minute and continued at this rate until the oil reaches a temperature of about 500° F. This should require about four hours. As soon as the required amount of oil has been charged into the still and circulation established, slide valve 17 is closed. This causes the oil to flow over baffle 15 in order to break up the bubbles of air and steam in the oil and to give a quiet zone around the suction of the pump. This allows the pump to take a full suction and avoids a gas-locked or air-bound pump.

In the fractionating tower, vapors and gases are separated from the oil and pass through bubble plates 49 to reflux condenser 50 which serves to knock back desirable fractions to the fractionating tower, permitting only undesirable lighter vapors and gases to pass into line 60. The temperature in the reflux condenser is controlled by water or oil circulated through lines 53, 54, 56 and 58. The amount circulated may be controlled by valves 55 and 57. Uncondensed vapors passing through reflux condenser 50 into line 60 are cooled in condenser 61 and passed via line 66 to separator 67 wherein incondensible gases and excess air are vented via line 68. Condensate is drawn off via line 69 and collected in storage tank 70. The oil and condensate in the fractionating tower drops back into the still 10.

Steam and/or air from lines 73 may be passed via line 77, valve 78 and perforated pipe 79 into the bottom of fractionating tower 48 to aid in the distillation of lighter fractions on the bubble plates 49. The amount of steam is varied, depending upon the specification to be met as will be described hereinafter.

Steam agitation may be used in the still bypassing steam via line 73, line 74 and valve 75 into the bottom spider 76. This steam agitation may be used during the entire run to augment circulation in the still and is generally increased after the oil reaches 500° F. in order to control the flash of the stock. This may require one hour.

The rate of circulation of the oil through the equilibrium conduit 39 may be controlled by varying the speed of pump 26 through shaft 27 and motor 28. The cooling medium, such as steam, air or oil, in heat exchanger 40 may be circulated in any desired amount in order to obtain the proper degree of cooling by heat exchange out of contact with the reacting materials.

When desired, other oils may be added to the oil in the still, by introducing them into the equilibrium conduit via line 45 and valve 46. This oil is also circulated and intimately mixed with the stock. This oil may be hot or cold in order to control the temperature and may be injected into the equilibrium conduit so that the melting point and penetration as well as the ductility of the final product may be varied at will. This oil may be selected so that any of these characteristics may be varied or it may be chosen to replace desirable constituents removed or converted during oxidation and distillation or to increase the amount of these constituents in the oil.

When the oil has been brought down to the desired grade, it may be left in the still until needed or pumped or drained out through line 81 and valve 82. Slide valve 17 is opened so that all of the oil can be removed.

It is preferable to maintain a slight vacuum in the still, i. e. about five inches of water, in order to facilitate the removal of gases.

The following is a specific example for carrying out the present invention in order to produce an oxidized asphalt. An asphaltic residuum obtained preferably by distilling off from asphaltic base oil the light oil and intermediate boiling oils but retaining preferably fractions of 100 Saybolt viscosity and up at 100° F. is charged through a preheater (not shown) into the still via line 13 as previously described above. As soon as the oil is in the still, the circulating pump is started and the oil is circulated at a high rate through the heat exchanger and back into the still. The heating medium is passed through the heat exchanger and the still is fired until the oil reaches a temperature of about 500° F. Air is forced or passed into the oil passing into the mixer 34 just before it enters the heat exchanger and equilibrium conduit. The amount of air is regulated so that the oil rises in temperature to about 500° F. As an example, oil is circulated by the pump at a rate of 1500 to 2000 barrels per hour and air is admitted at the rate of 200 cubic feet per minute until the oil reaches 300° F. The air is then increased to 300 cubic feet per minute until the oil has obtained a maximum of 500° F. As soon as the oil reaches this temperature, the fire is put out under the still and sufficient cooling medium is circulated in the heat exchanger and equilibrium conduit to maintain the temperature of the oil being treated at approximately 500° F. Hot or cold water, or oil or steam, of controlled temperature and pressure, or air, may be used to control the temperature in the conduit. The length of pipe in the exchanger and equilibrium conduit and the circulation of oil and the air input is such that the oxygen of the air is substantially used up before the oil is passed to the fractionating tower where the air and gases and light vapors are removed and the oil returned to the still. The oil is circulated very rapidly and thus all parts of the oil are kept in intimate contact with the air at practically all time.

If the temperature be raised to too high a degree, considerable distillation of the lighter fractions will take place and the stock will attain the proper penetration before the desired melting point is reached. This is due to the removal of light fractions which oxidize to a more plastic material than the heavier fractions. By using the equilibrium conduit a minimum amount of air is used so that we are able to use about half the amount now used in the conventional method. We have also discovered that by using rapid circulation and the controlled amount of air and the carefully regulated temperature in the exchanger and equilibrium conduit, the running time is reduced to half that now regularly required in other processes.

We have also discovered, as previously stated, that during oxidation and distillation, oils of lubricating oil viscosity range are carried out of the still together with the light gases and vapors produced during oxidation. The retaining of these oils in the asphalt produces a more superior asphalt than if they were removed. Therefore, it is desirable to knock back into the still these oils and this may be accomplished by properly controlling the temperature in the reflux condenser 50 so as to condense these oils and return them to the fractionating tower and then to the still. In order that no fractions lighter than those desired be returned to the still, the fractionating tower 48 is provided to effect a fractionation of the oil and to permit the removal of these lighter and undesirable oils from the constituents to be returned to the still. This distillation and fractionation may be aided by the introduction of steam or air into the bottom of the fractionating tower through perforated pipe 79. The fractionating equipment is so controlled that only light gas oil and still lighter products, such as naphtha, are allowed to pass over to condenser 67. Heavier products, such as heavier gas oil and heavier fractions, say from 40 seconds Saybolt at 100° F. and higher, are refluxed and returned to the still 10.

It is to be pointed out that although, as a general rule, temperatures of 500° F. or less are to be preferred, higher temperatures can be employed to accelerate the reaction and to obtain more vigorous oxidation by employing the rectifying column to return the oils distilled. It will be understood that the importance of this return is augmented because of the increased vaporization obtained at the higher temperatures.

Steam may be admitted during the process through agitation spider 76. This aids to insure circulation of the oil in the still and to obtain the right flash point for the product. This will be understood by those skilled in the art. The gases and vapors are withdrawn from the still, as previously described, by the maintenance of a slight vacuum in the still.

Steam may also be admitted through line 35 together with air passed into line 37 so as to control the rate of oxidation and also to control the ductility and flash. It will be observed that the apparatus may be also very effectively employed for making steam blown asphalt. In this case, no air is admitted and a heating medium is circulated through the heat exchanger 40. This insures an intimate mixture of asphalt and steam and a controlled distillation of high efficiency. The fractionating equipment may also be employed in producing steam blown asphalt in order to knock back desired constituents into the still. The fractionating tower 48 may be effectively employed to control also the character of the oil to be returned to the still. The process is, therefore, of general applicability where a liquid is to be reacted on or distilled by means of a vapor or gas. However, the invention is of primary importance in the production of air-blown asphalt and of importance also in steam distillation.

As previously stated, the melting point, penetration and ductility of asphalt may be very effectively and independently controlled by the addition of certain materials or oils to the asphaltic oil passing into the equilibrium conduit. Thus, such oil fractions as steam blown asphalt, lubricating oil fractions, gas oil, sulphurized oil, vegetable oils and animal oils, may be introduced via line 45 and intimately mixed with the oil passing to the equilibrium conduit. The character of the oil introduced is dependent upon the particular characteristic desired to be varied as will be understood by those skilled in the art. The character of the oil introduced may be similar to that of those constituents already in the asphaltic oil and which constituents are desirable in oxidized asphalt. Thus, these constituents may be increased in proportion, or may be added in sufficient quantities in order to replace some of the constituents removed by distillation or decomposed by cracking during oxidation. The oil may be added prior to the oxidation reaction, and thus be also oxidized, or it may be added after substantially complete oxidation of the asphaltic oil has been effected. The addition is generally determined by the character of the addition oil and by the characteristic desired to be varied.

It will be observed that many variations of the above procedure can be made without departing from the spirit of the invention. Thus, the cooling can be obtained by cooling the oil in the still 10 by passing the cooling medium through a coil in the still. The agitation of the oil in the still may be effected by circulation by mechanical means or by the injection of an inert gas or by the air used in the process. The equilibrium conduit may be positioned either within the still or in an external heating zone, such as a furnace, or the oil may be withdrawn from the still, passed through a cooler and then conducted through the conduit 39, prior to its introduction into the still. In each case, the oil in the equilibrium conduit on its reaction with air, is not permitted to exceed a predetermined temperature. While the precooling of the oil before its introduction into the conduit 39 may have some advantages, the cooling of the oil during the reaction with air is preferred. It is believed that of these methods for accomplishing this, i. e. cooling the coil itself, or cooling the oil in still 10 when the coil 39 is immersed in the still 10, the former is preferred. It is believed that the construction illustrated in the drawing is the most advantageous.

While the present invention has been illustrated as a batch system, it will be observed that the process may be carried out continuously. Thus, by providing a plurality of units such as those described above and connecting them in series and by connecting a pair of grading stills in parallel with the last unit, the oxidation process may be carried out continuously in the first mentioned units and the grading stills may be used alternately as batch stills to grade and finish the asphalt. Additionally, by continuously introducing oil via 45 and/or 35 and withdrawing oxidized asphalt via 81, the process can also be made continuous.

We have discovered that by properly controlling the heat-air-steam, time, rate of circulation, refluxing, and character of extraneous oil introduced, a wide variation of melting point, penetration, and ductility may be obtained. The individual control will, as is well recognized, depend on the various oils treated and the application of the principles herein disclosed to various oils will be readily understood by those skilled in the art.

In the operation of our process, it is possible to produce an oxidized asphalt from an oil which has been evenly and uniformly oxidized, i. e. it does not contain large proportions of over or under-oxidized materials which occur in the prior methods of oxidation. Moreover, our process is more economical than any other process in that it requires 50% or less air and running time than other oxidation processes. Most important of all, a greater yield of oxidized asphalt is realized due to the refluxing of desirable constituents back to the oil undergoing oxidation. The oxidized asphalt will also have greater solubility characteristics due to the fact that refluxed oils are not oxidized into carbonaceous materials. By our process, it is entirely possible to produce any grade of oxidized material by an even and uniform control of air-steam heat, rate of circulation, refluxing of desirable constituents and character of the extraneous oil introduced into the oil undergoing oxidation and to produce an oxidized material with the production of practically no carbon in the still.

The above description is not to be taken as limiting but merely as illustrative of the invention and as one mode of carrying it out. Many changes can be made within the scope of this invention which is set forth in the following claims.

We claim:

1. A process for producing asphalt which comprises commingling oil with oxygen containing gas at an elevated temperature sufficient to oxidize said oil into asphalt, separating vapors and gases from said oil, condensing a portion of said vapors and returning the condensate to the oil undergoing oxidation to asphalt.

2. A process for producing asphalt which comprises commingling oil with oxygen containing gas at an elevated temperature sufficient to oxidize said oil into asphalt, regulating the temperature of the oil by heat interchange, separating vapors and gases from said oil, condensing a portion of said vapors and returning the condensate to the oil undergoing oxidation to asphalt.

3. A process for producing asphalt which comprises commingling oil with oxygen containing gas at an elevated temperature sufficient to convert said oil into asphalt, separating vapors and gases from said oil, condensing a portion of said vapors, returning the condensate to the oil undergoing conversion and adding a second oil fraction to said oil undergoing oxidation to asphalt.

4. A process for producing asphalt which comprises oxidizing oil to asphalt with an oxidizing gas at an elevated oxidizing temperature, vaporizing oil fractions from said oxidized oil, condensing all oil fractions of gas oil and heavier grades and returning said condensed fractions to said oil undergoing oxidation to asphalt.

5. A process for producing asphalt which comprises oxidizing oil to asphalt with an oxidizing gas at an elevated oxidizing temperature, vaporizing oil fractions from said oxidized oil, condensing all oil fractions of viscosity approximating those of lubricating oil characteristics and returning said condensed fractions to said oil undergoing oxidation to asphalt.

6. A process for producing asphalt which comprises oxidizing oil to asphalt with an oxidizing gas at an elevated oxidizing temperature, vaporizing oil fractions from said oxidized oil, condensing all oil fractions of viscosity approximating 40 seconds Saybolt at 100° F. and heavier and returning said condensed fractions to said oil undergoing oxidation to asphalt.

7. A process for producing asphalt which comprises oxidizing oil to asphalt with an oxidizing gas at an elevated oxidizing temperature, vaporizing oil fractions from said oxidized oil, condensing all oil fractions of viscosity approximating 100 seconds Saybolt at 100° F. and heavier and returning said condensed fractions to said oil undergoing oxidation.

8. A process for producing asphalt which comprises maintaining a bulk supply of oil at elevated oxidizing temperature, withdrawing a portion of said oil, commingling said withdrawn oil with oxygen containing gas to convert said oil into asphalt, regulating the temperature of said mixture, separating vapors and gases from said mixture in a fractionating tower, condensing a portion of said vapors and returning said condensate and separated oil to said bulk supply of oil.

9. A process for producing asphalt which comprises maintaining a bulk supply of oil at elevated oxidizing temperature, withdrawing a portion of said oil, commingling said withdrawn oil with oxygen containing gas, regulating the temperature of said mixture, introducing said commingled gases and oil into a fractionating tower, separating gases and vapors from said oil in said tower, rectifying the vapors and refluxing a portion of said vapors and unvaporized oil back to said fractionating tower to said bulk supply of oil.

10. A process for producing asphalt which comprises maintaining a bulk supply of oil at elevated oxidizing temperatures, withdrawing a portion of said oil, commingling said withdrawn oil with an oxygen containing gas to convert said oil into asphalt, regulating the temperature of said mixture, separating vapors and gases from said mixture in a fractionating tower, passing said separated vapors and gases to a reflux condenser, condensing a portion of said vapors in said reflux condenser, refluxing condensate to said fractionating tower and returning said reflux condensate and separated oil to said bulk supply of oil.

11. A process for producing asphalt which comprises maintaining a bulk supply of oil at elevated oxidizing temperatures, withdrawing a portion of said oil, commingling said withdrawn oil with oxygen containing gas, introducing a second oil fraction into said withdrawn oil while in contact with said oxygen containing gas, separating vapors and gases from said mixture in a fractionating tower, removing vapors and gases from said fractionating tower and returning oil in said fractionating tower to said bulk supply of oil.

12. A process for producing asphalt which comprises maintaining a bulk supply of oil in a drum at elevated oxidizing temperatures, introducing a portion of said oil into an injector, introducing oxygen containing gas into said injector, commingling said mixture with a second oil fraction, passing said mixture through an elongated conduit maintained in heat exchange relationship with a cooling medium to control temperature in said conduit, introducing said commingled gases and oil into a fractionating tower, separating gases and vapors from said oil in said tower, rectifying the vapors in a reflux condenser, refluxing condensate to said tower, returning reflux condensate and unvaporized oil to said bulk supply, repeating said process until substantially all of said oil is converted into asphalt and withdrawing asphalt from said drum.

13. In an apparatus for producing asphalt in combination, a drum, a pump, means for connecting said drum and pump, an elongated conduit, means for connecting said elongated conduit and pump, an injector positioned between said elongated conduit and pump, a pipe for introducing gas into said injector, a fractionating tower, means for connecting said fractionating tower and said elongated conduit and means for connecting said fractionating tower and drum.

14. In an apparatus for producing asphalt in combination, a drum, a pump, means for connecting said drum and pump, an elongated conduit, means for controlling the temperature in said elongated conduit, means for connecting said elongated conduit and pump, an injector positioned between said elongated conduit and pump, a pipe for introducing gas into said injector, a fractionating tower, means for connecting said fractionating tower and said elongated conduit and means for connecting said fractionating tower and drum.

15. In an apparatus for producing asphalt in combination a drum, a pump, means for connecting said drum and pump, an elongated conduit, means for controlling the temperature in said elongated conduit, means for connecting said elongated conduit and pump, an injector positioned between said elongated conduit and pump, a pipe for introducing gas into said injector, a fractionating tower, means for connecting said fractionating tower and said elongated conduit, means for connecting said fractionating tower and drum, a reflux condenser and means for connecting said reflux condenser and fractionating tower.

16. In an apparatus for producing asphalt in combination a drum, a pump within said drum, means for connecting said pump and drum, an elongated conduit, means for controlling the temperature in said elongated conduit, means for introducing other oil into said elongated conduit, means for connecting said elongated conduit and pump, an injector positioned between said elongated conduit and pump, a pipe for introducing gas into said injector, a fractionating tower, means for connecting said fractionating tower and said elongated conduit and means for connecting said fractionating tower and drum.

17. In an apparatus for producing asphalt in combination a drum, a pump within said drum, means for connecting said pump and drum, an elongated conduit, means for controlling the temperature in said elongated conduit, means for introducing other oil into said elongated conduit, means for connecting said elongated conduit and pump, an injector positioned between said elongated conduit and pump, a pipe for introducing gas into said injector, a fractionating tower, means for connecting said fractionating tower and said elongated conduit, means for connecting said fractionating tower and drum, a reflux condenser and means for connecting said reflux condenser and fractionating tower.

18. In an apparatus for producing asphalt in combination a drum, means for heating oil in said drum. a steam line in said drum for introducing steam into said oil, a pump within said drum for withdrawing oil from said drum, an injector connected to the discharge of said pump and into which oil from said drum is passed, a pipe for introducing air into said injector to oxidize said oil, an elongated conduit connected to said injector for effecting a reaction between said oil and air, means for controlling the temperature in said elongated conduit externally, a fractionating tower positioned in open relation with said drum, means for passing said mixture of oil and air to said fractionating tower and a reflux condenser positioned above said fractionating tower and connected therewith.

19. A process for producing asphalt which comprises maintaining a bulk supply of oil at elevated oxidizing temperatures, withdrawing a portion of said oil, commingling said withdrawn oil with oxygen containing gas, introducing a second oil fraction adapted to control the characteristics of the finished asphalt, into said withdrawn oil while in contact with said oxygen containing gas, separating vapors and gases from said mixture in a fractionating tower, removing vapors and gases from said fractionating tower and returning oil in said fractionating tower to said bulk supply of oil.

20. A process for producing asphalt which comprises commingling oil with oxygen containing gas at an elevated temperature sufficient to oxidize said oil to asphalt, vaporizing oil fractions from said oil, fractionating said vapors and returning condensate produced in said fractionation to the oil undergoing oxidation to asphalt.

21. A process for producing asphalt which comprises commingling oil with oxygen containing gas at an elevated temperature sufficient to convert said oil into asphalt, vaporizing oil fractions from said oil, fractionating said vapors, returning condensate produced in said fractionation to the oil undergoing oxidation and adding a second oil fraction to said oil undergoing oxidation to asphalt to control the characteristics of the final asphalt.

22. A process for producing asphalt which comprises commingling oil with oxygen containing gas at an elevated temperature sufficient to oxidize said oil to asphalt, vaporizing oil fractions from said oil, rectifying said vapors in a fractionating column to separate undesirable light oil and gases from desirable heavier products and returning said heavier products to said oil undergoing oxidation.

23. A process for producing asphalt which comprises vaporizing oil fractions from a body of oil in a still, introducing said vapors into a fractionating column, commingling the residual oil from said body of oil with oxygen containing gas at an elevated temperature sufficient to oxidize said residual oil to asphalt, passing said residual commingled gas and residual oil through said fractionating column, whereby the oxidized oil is separated into an unvaporized liquid fraction and a vapor, fractionating said vapors in said fractionating column to form a condensate and returning said condensate and unvaporized oil from said fractionating column to said still, and withdrawing asphalt from said still.

24. A process for producing oxidized asphalt from oil which comprises introducing oil into an oxidizing zone, introducing air into said oxidizing zone, intimately contacting the oil and the air at an elevated oxidizing, asphalt-making temperature in said oxidizing zone, separating vaporized products from the oil, introducing the air into the oxidizing zone until said oil is converted into asphalt, and introducing into the oil undergoing oxidation an auxiliary oil different from the original oil entering the process and different from the resultant oxidized oil into which said auxiliary oil is introduced to regulate the physical characteristics of the resulting asphalt.

25. A process for producing oxidized asphalt from oil which comprises commingling oil and air at an elevated temperature sufficient to convert said oil into asphalt, separating vapors from the oil and introducing a liquid oil fraction into the oil undergoing oxidation to asphalt, said fraction containing components as volatile as components of the aforementioned vapors removed from the oil.

26. A process for producing oxidized asphalt from oil which comprises commingling oil and air at an elevated temperature sufficient to convert said oil into asphalt, separating vapors from the oil and introducing into the oil undergoing oxidation an oil fraction vaporizable at the temperature and under the conditions of said oxidation to control the characteristics of the resultant asphalt.

27. A process for producing oxidized asphalt from oil which comprises commingling oil and air at an elevated temperature sufficient to convert said oil into asphalt, separating vapors from the oil and introducing into the oil undergoing oxidation an oil fraction having a Saybolt viscosity of above approximately 40 seconds at 100° F.

28. A process for producing oxidized asphalt from oil which comprises commingling oil and air at an elevated temperature sufficient to convert said oil into asphalt, separating vapors from the oil and introducing into the oil undergoing oxidation an oil fraction having a Saybolt viscosity of above approximately 100 seconds at 100° F.

29. A process for producing oxidized asphalt from oil which comprises commingling oil and air at an elevated temperature sufficient to oxidize said oil into asphalt, and introducing into said oil undergoing oxidation an auxiliary oil different from the original oil and different from the resultant oxidized oil to control the temperature of oxidation and physical characteristics of the resulting asphalt.

30. A process for producing oxidized asphalt from oil which comprises commingling oil and air at an elevated temperature sufficient to oxidize said oil into asphalt, and introducing a relatively cool oil into said oil undergoing oxidation to asphalt to control the temperature of oxidation.

31. A process for producing oxidized asphalt from oil which comprises commingling oil with oxygen containing gas at an elevated temperature sufficient to oxidize said oil into asphalt, separating vapors and gases from said oil, condensing a portion of said vapors, returning the condensate to the oil undergoing oxidation to asphalt, and introducing a relatively cool oil into said oil undergoing oxidation to asphalt to control the temperature of oxidation.

Signed at Los Angeles, in the county of Los Angeles, and State of California, this 1st day of October A. D. 1930.

EARLE W. GARD.
PHILIP SUBKOW.